Figure 1:
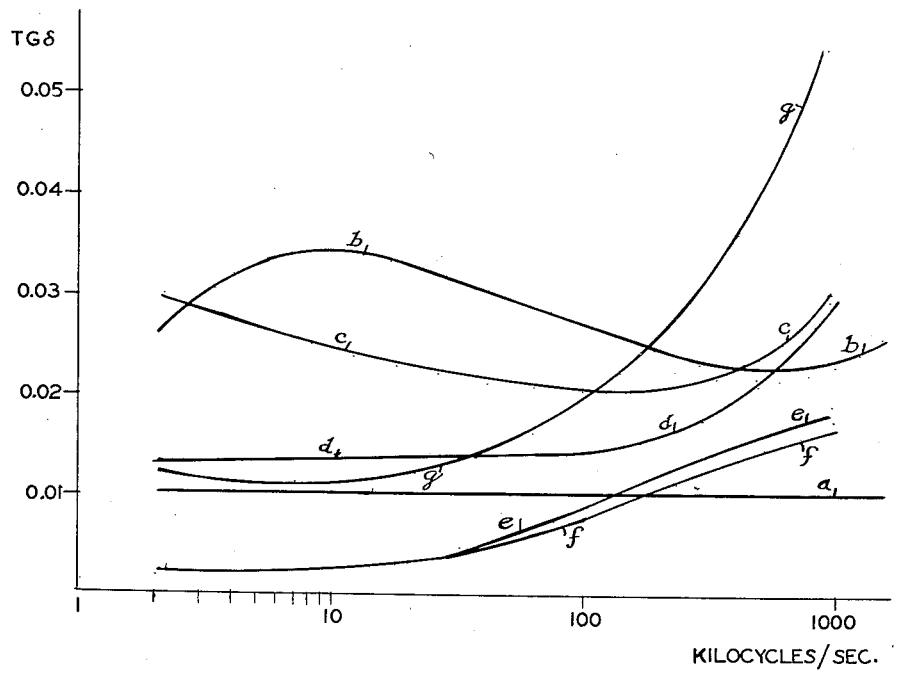

SINTERED CUBIC FERRITE MATERIAL HAVING A LOSS COEFFICIENT LESS THAN 0.06 AT FREQUENCIES BETWEEN 10 KC/SEC. AND 1000 KC/SEC.

JACOB LOUIS SNOEK
INVENTOR

BY
ATTORNEY

Patented Oct. 26, 1948

2,452,529

UNITED STATES PATENT OFFICE 2,452,529

MAGNET CORE

Jacob Louis Snoek, Eindhoven, Netherlands, assignor to Hartford National Bank & Trust Co., Hartford, Conn., trustee Application September 17, 1945, Serial No. 616,928
In the Netherlands October 24, 1941

Section 1, Public Law 690, August 8, 1946
Patent expires October 24, 1961

25 Claims. (Cl. 252—62.5)

This invention has for its purpose to manufacture magnetic cores constituted by ferrites which at low induction lead to small losses, even with high frequencies, which is of importance for radio and telephonic purposes, for example for the manufacture of filter coils, pupin coils, transformers, electro-acoustic devices.

According to known methods, it is possible to prepare magnetic cubic ferrites which have a high specific electrical resistance, for example 1000 ohms cm. and higher, so that the eddy-current losses are low.

Reference is made to my copending U. S. applications, Serial Nos. 617,392 and 617,393 filed September 19, 1945, which are continuations-in-part of the present application.

The present invention is based on the recognition of the fact that the losses which may occur with such ferrites in spite of the eddy current losses being almost zero, are related to the percentage of oxygen of the ferrite.

As regards the percentage of oxygen it may be mentioned that it is known that a ferrite, when it is heated to high temperatures such, for example, as are used in the preparation, can give off oxygen. In order to avoid such a shortage of oxygen, the said heating has been carried out in pure oxygen.

It has now been found that, even if a heating required for the preparation or any other purpose is carried out in pure oxygen, a small shortage of oxygen frequently occurs and that to our surprise such a small shortage of oxygen, which may amount to only a few hundredths of per cent by weight of the total weight of the ferrite, is highly detrimental to the losses.

The present invention consists in that in the manufacture of a core constituted by a magnetic cubic ferrite having a specific resistance higher than 1000 ohms cm. so high a percentage of oxygen of the ferrite is provided that the coefficient of losses $tg\ \delta$ in the frequency range of from 10 to 1000 kilocycles per sec. is less than 0.06.

Such a percentage of oxygen may be obtained in different manners, according to the nature of the ferrite.

The method which in principle is simplest consists in that by means of a suitable choice of the conditions it is ensured that the heating temperature required for the preparation of the ferrite is maintained sufficiently low.

As regards this heating temperature it is remarked that, for example in the case of a ferrite prepared by heating an intimate mixture of the solid oxides constituting the ferrite, the temperature will depend on the intensity and the fineness with which the mixture is ground. A very fine mixture which has been ground for a long time will be capable of giving within a reasonable time a homogeneous product completely reacted at lower temperatures than a coarse mixture which has been ground for a short time. In view of the initial permeability of the final product such a complete reaction is of great importance, as will be set out more fully hereinafter.

If a ferrite is prepared by precipitating a solution of the metal compounds and heating the finely distributed deposit, then a complete reaction generally requires a lower heating temperature than if the ferrite is obtained in the above-described manner.

Although the variation in the conditions of preparing a ferrite permits the heating temperature required to be slightly varied, it is in most cases not possible in practice to provide for a sufficiently high percentage of oxygen in the preparation of the ferrite. According to the invention, such a ferrite having too low a percentage of oxygen, which is consequently not saturated relatively to oxygen, is caused to take up oxygen at a comparatively low temperature.

The conditions, more particularly the temperature at which a ferrite is caused to take up oxygen, depend on various factors, as on the amount of oxygen which has to be taken up to obtain a value for $tg\ \delta$ smaller than 0.06 between 10 to 1000 kilocycles per sec., on the degree to which all parts of the ferrite are accessible to oxygen, i. e. on the fineness of its grain and hence its porosity, and also on the nature and the composition of the ferrite used.

It has been found that the values of losses are lowest if the ferrite has taken up as much oxygen as possible. Since the amount of oxygen taken up increases with a decrease in temperature, it is consequently advisable to use low temperatures. On the other hand, however, it is necessary to consider the circumstance that the speed with which oxygen is taken up decreases with a decrease in temperature. This speed further greatly depends on the fineness of grain and the porosity of the ferrite and in view of the time otherwise taken up by the absorption of oxygen, it is desirable that the ferrite should be utilised in the fine-grained, porous state.

An important factor which has to be considered in using the invention is the initial permeability of the final product, since the usefulness of a magnetic core is substantially determined by the value of the quotient $$\frac{tg\ \delta}{\mu}$$

of the coefficient of losses and the initial permeability. Cores having a high initial permeability and low losses are of much importance. Consequently, in the manufacture of such cores, it will be desired to combine the steps according to the invention with steps necessary for the obtainment of a high initial permeability, care having to be taken to see to it that the various steps do not conflict with each other.

It has now been found that the value of the initial permeability may be advantageously influenced by heating to a temperature sufficiently high to form a single homogeneous ferrite phase, for example in the preparation of the magnetic cubic ferrite.

With regard to the absorption of oxygen one should be careful, however, that in heating use is made of a temperature which is not so high that the material is closed by sintering. If such an undesirable heating has taken place, this becomes manifest in the coarse granular form of the material which is in this case no longer capable of taking up a sufficient amount of oxygen.

In view of the permeability it is generally advisable that the cooling after the said heating takes place slowly so that tensions due to chilling in the ferrite are avoided. A quickness of at most 10° C. per minute is sufficiently slow for high requirements. If there is a risk of an undesirable amount of a second phase being formed, which detrimentally affects the initial permeability, the cooling down may take place with greater quickness, for example about 100° C. per minute. It further ensues from the foregoing that during the absorption of oxygen the temperature should preferably remain higher than the temperature at which the formation of a second phase may begin.

As a matter of fact, the initial permeability of a ferrite depends on its nature and its composition. Thus, the possibility of avoiding the formation of a second phase greatly varies with different ferrites. However, the obtainment of a röntgenograprically homogeneous ferrite is possible in many cases.

It has further been found that, like with other magnetic materials, the initial permeability frequently exhibits a maximum closely below the Curie point. A ferrite having a Curie point comprises approximately between 50° C. and 250° C. will consequently be very advantageous. Such a ferrite is obtained, for example, by combining zinc ferrite, which has a low Curie point, with a ferrite having a higher Curie point, as nickel ferrite.

For obtaining a homogeneous ferrite phase the use of pure primary materials in the manufacture of ferrite is of primary importance. In order to insure complete reaction of the starting materials in the so-called dry method at as low a temperature as possible, they are subjected to a grinding operation, the grinding preferably being effected to such extent as to obtain a mean size of particles of 1 micron or smaller. Since, as is well-known, such methods of grinding may involve contamination of the material to be ground due to wear of the grinding device and such a contamination is undesirable because of the high requirements of purity required, this factor should be considered in the choice of the grinding device.

A highly advantageous method of preparation for a ferrite is the so-called wet method, since during the precipitation of a solution of the constituents of the ferrite a very great fineness of particles, i. e. a mean size of particles smaller than 0.1 micron, may be obtained, so that heating required for complete reaction may be effected at a low temperature. Further, in the preparation by the wet method a ferrite may be easily obtained in the pure state. If it is desired to render a deposit thus obtained suitable for moulding, it is preheated after drying to, for example, a temperature of about 500° to 700° C.

According to the invention, the quotient $$\frac{tg\ \delta}{\mu}$$

may be less than 0.001 at 10 to 1000 kilocycles per sec. Magnetic cores according to the invention may be successfully used in coils for radio and telephonic purposes. Providing one or more so-called airgaps permits of improving their properties still further in some respect.

Fig. 1 graphically illustrates the behavior of the loss factor $tg\ \delta$ as a function of frequency of the mixed crystal ferrites according to the present invention.

Figure 2:
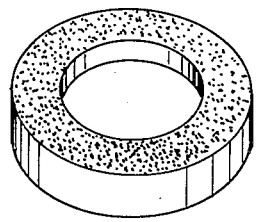

Fig. 2 shows a core of ferrite material in accordance with the invention.

The invention will now be explained more fully with reference to several practical examples describing the preparation of some ferrites having low losses and in part high values for the permeability. All the ferrites specified have a so-called spinel structure. The values mentioned in the examples for the initial permeability $\mu$ have been found by means of measurements on an annular core of the material. The quality of a material relatively to the losses is expressed in the magnitude $$tg\ \delta = \frac{R}{\omega L}$$

R being the loss resistance, L the inductance of a coil wound on an annular core, and $\omega$ the angular frequency at which R and L are measured.

The coefficient of losses $tg\ \delta$ is the tangent of the angle of phase displacement of the current flowing in the coil so that the tangent of $\delta$ is in effect the reciprocal of the Q of the core.

Example I

A pure copper-cadmium ferrite constituted by 25 mol. percent of copper oxide, 25 mol. percent of cadmium oxide and 50 mol. percent of ferric oxide, which ferrite is obtained by sintering at 1000° C. during one hour and a half, is ground during about 200 hours in an iron ball-mill. The ground ferrite is moulded under a pressure of 4 tons/cm.³ to form a ring having a diameter of 3 cms. and a section of 4×4 mms., which is subsequently heated for 6 hours at 1000° C. in a current of oxygen, followed by cooling at a rate of 5° C. per minute in the current of oxygen. The core obtained has a $tg\ \delta$ of about 0.01 at a frequency of 1000 kilocycles per sec. and an initial permeability of 100. The value $$\frac{tg\ \delta}{\mu}$$

is consequently about 0.0001 at 1000 kilocycles per sec. The dependency of $tg\ \delta$ on frequency is represented by curve $a$ of the accompanying drawing.

Example II

A mixture of 20 mol. percent of pure copper oxide, of 30 mol. percent of pure zinc oxide and of 50 mol. percent of pure ferric oxide is ground during about 200 hours in an iron ball-mill. The mixture is moulded in the manner described in example I to form a ring which is heated for two hours at 1050° C. in a current of oxygen, followed by cooling at a rate of 5° C. per minute to 600° C., at which temperature the core is maintained during 12 hours. At last, the cooling is continued till room temperature, all this in oxygen. The core obtained has a $tg\ \delta$ of about 0.02 at 1000 kilocycles per sec. and an initial permeability of 200. The value of $$\frac{tg\ \delta}{\mu}$$

consequently amounts to 0.0001 at 1000 kilocycles per sec. The dependency of $tg\ \delta$ on frequency is represented by curve $b$ of the drawing.

A copper-zinc ferrite of the said composition may alternatively be prepared by precipitating 1 litre of a purified solution of 0.2 gramme-molecule of copper sulphate, 0.3 gramme-molecule of zinc sulphate and 1 gramme-molecule of iron nitrate in the heat with 0.5 litre of a 9 molar solution of caustic soda, by drying the deposit after washing out and subjecting it to a pre-heating at 700° C. for the purpose of improving its mouldability and further by moulding it to form a ring in the manner described in Example I and subsequently heating. When the heating is effected during about 3 hours at 900° C., followed by cooling to 600° C. at a rate of 5° C. per minute and this temperature is maintained during 30 hours and at last the cooling is continued till room temperature, all this in a current of oxygen then the dependency of $tg\ \delta$ on frequency for the core thus obtained is represented by curve $c$ of the drawing. The initial permeability amounts to 500. When this core of copper-zinc ferrite obtained by the wet process is maintained after the treatment at 600° C. for another 19 hours at 510° C., for 34 hours at 410° C. and for 12 hours at 310° C., all this in oxygen, then a core is obtained of which the dependency of the $tg\ \delta$ on frequency is represented by curve $d$ of the drawing. The initial permeability of the core thus obtained amounts to 410.

Example III

A mixture of 28 mol. per cent of pure magnesium oxide, 18 mol. per cent of pure zinc oxide and 54 mol. per cent of pure ferric oxide is ground during 30 hours in an iron hurling mill. In the manner described in Example I, the mixture is moulded to form a ring which is heated in oxygen during 2 hours to 1400° C., followed by a slow cooling in oxygen at a rate of 5° to 10° C. per minute. The product obtained had a value $tg\ \delta = 0.02$ at 1000 kilocycles per sec. and an initial permeability of 150.

The dependency of $tg\ \delta$ on frequency is represented by curve $e$ in the drawing.

When this ferrite core, which has been slowly cooled, is heated to 1000° C., is maintained at this temperature during 18 hours and then at 750° C. during 20 hours, followed again by a slow cooling, all this in oxygen, we obtain the $tg\ \delta$ values of curve $f$ of the figure.

Example IV

A mixture of 20 mol. per cent of pure nickel oxide, 30 mol. per cent of pure zinc oxide and 50 mol. per cent of pure ferric oxide is ground during 30 hours in an iron hurling mill. The mixture is moulded in the manner described in Example I to form a ring which is heated for 1 hour to 1400° C. is subsequently maintained for 16 hours at 930° C. and then cooled down slowly at a rate of about 10° C. per minute, all this in oxygen. The $tg\ \delta$ values of the core obtained are represented by curve $g$ of the figure. The initial permeability amounts to 560. Submitting this core to a treatment of oxygen during 12 hours at 1000° C. and during 20 hours at 750° C. has not the effect of varying the $tg\ \delta$ values. For the purpose of defining the terms "ferrite," "mixed crystal," and "soft" magnetic materials, the following definitions will be employed in connection with the above-noted terms as used throughout the specification and in the appended claims.

A "ferrite" is a crystalline material which is a compound of the reaction product of a metal oxide and iron oxide having the empirical formula $MFe_2O_4$ wherein M represents a bivalent metal. The material may also be defined as a metallic salt of the hypothetical acid $H_2Fe_2O_4$.

A "mixed crystal" ferrite is a ferrite material comprising two or more ferrites as hereinbefore defined which are chemically combined together to form a single homogeneous crystalline compound.

The term "soft" magnetic material means magnetic material having a low remanence and a low coercivity when the applied inductive field is removed from the material.

Within the scope of the definitions noted above, I have described my invention with specific examples and methods of execution, which, however, will suggest other obvious modifications to those skilled in the art without departing from the spirit and scope of my invention.

What I claim is:

1. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by a plurality of ferrites, said mixed crystal ferrite having a specific resistance greater than about 1000 ohm-cm. and having an oxygen content at which the coefficient of losses $tg\ \delta$ thereof in the range of frequencies between about 10 kc./sec. and about 1000 kc./sec. is less than about 0.06.

2. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by a plurality of ferrites, said mixed crystal ferrite having a specific resistance greater than about 1000 ohm-cm., and having an oxygen content at which the coefficient of losses $tg\ \delta$ thereof in the range of frequencies between about 10 kc./sec. and about 1000 kc./sec. is less than about 0.06, said mixed crystal ferrite having a Curie point greater than about 50° C. and less than about 250° C.

3. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by zinc ferrite and a second ferrite having a Curie point greater than zinc ferrite, said mixed crystal ferrite having a specific resistivity greater than about 1000 ohm-cm., and having an oxygen content at which the coefficient of losses $tg\ \delta$ thereof in the range between about 10 kc./sec. and about 1000 kc./sec. is less than about 0.06, said mixed crystal ferrite having a Curie point greater than about 50° C. and less than about 250° C.

4. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by zinc ferrite and a second ferrite having a Curie point greater than zinc ferrite, said mixed crystal ferrite having a specific resistivity greater than about 1000 ohm-cm. and having an oxygen content at which the quotient of the coefficient of losses $tg\ \delta$ divided by the initial permeability $\mu$ of said mixed crystal ferrite in the range of frequencies between about 10 kc./sec. and about 1000 kc./sec. is less than about 0.001 and having a coefficient of losses $tg\ \delta$ thereof in the range of frequencies between about 10 kc./sec. and about 1000 kc./sec. which is less than 0.06, said mixed crystal ferrite having a Curie point greater than about 50° C. and less than about 250° C.

5. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by copper ferrite and cadmium ferrite, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

6. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by copper ferrite and zinc ferrite, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

7. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by magnesium ferrite and zinc ferrite, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

8. A soft ferromagnetic core material having low magnetic losses in a range of frequencies between 10 kc./sec. and 1000 kc./sec. and which is particularly suited for cores in inductance coils and the like employed in radio circuits operating in the said range of frequencies consisting essentially of a homogeneous mixed crystal ferrite constituted by nickel ferrite and zinc ferrite, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

9. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by copper ferrite and cadmium ferrite having oxide components in an amount equivalent to approximately 25 mol. per cent of cadmium oxide, 25 mol. per cent of copper oxide, and 50 mol. per cent of iron oxide, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

10. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by copper ferrite and zinc ferrite having oxide components in an amount equivalent to approximately 20 mol. per cent of copper oxide, 30 mol. per cent of zinc oxide, and 50 mol. per cent of iron oxide, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

11. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by magnesium ferrite and zinc ferrite having oxide components in an amount equivalent to approximately 28 mol. per cent of magnesium oxide, 18 mol. per cent of zinc oxide, 54 mol. per cent of iron oxide, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

12. A soft ferromagnetic core material having low magnetic losses in a range of frequencies between 10 kc./sec. and 1000 kc./sec. and which is particularly suited for cores in inductance coils and the like employed in radio circuits operating in the said range of frequencies, consisting essentially of a homogeneous mixed crystal ferrite constituted by nickel ferrite and zinc ferrite having oxide components in an amount equivalent to approximately 20 mol. percent of nickel oxide, 30 mol. percent of zinc oxide and 50 mol. percent of iron oxide, said mixed crystal ferrite having a specific resistivity greater than about 1000 ohm-cm., and having an oxygen content at which the coefficient of losses $tg\ \delta$ thereof in the range of frequencies between about 10 kc./sec. and about 1000 kc./sec. is less than about 0.06.

13. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of heating a mixture of a first cubic ferrite and a second cubic ferrite to a temperature between about 900° C. and about 1400° C. in an oxygen controlling atmosphere to produce a homogeneous mixed crystal ferrite, and regulating the oxygen content of said mixed crystal ferrite to produce a mixed crystal ferrite material having a coefficient of losses $tg\ \delta$ in the range of frequencies between about 10 kc./sec. and about 1000 kc./sec. which is less than about 0.06.

14. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of heating a mixture of a first cubic ferrite and a second cubic ferrite in an oxygen atmosphere to a temperature of between about 900° C. and about 1400° C. to produce a homogeneous mixed crystal ferrite, and regulating the oxygen content of said mixed crystal ferrite to produce a mixed crystal ferrite having a coefficient of losses $tg\ \delta$ in the range of frequencies between about 10 kc./sec. and about 1000 kc./sec. which is less than about 0.06.

15. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of pulverizing a mixture of a first cubic ferrite and a second cubic ferrite to an average grain size of less than about 1 micron, heating the said mixture to a temperature between about 900° C. and about 1400° C. in an oxygen controlling atmosphere to produce a homogeneous mixed crystal ferrite, regulating the oxygen content of said mixed crystal ferrite to produce a mixed crystal ferrite having a coefficient of losses $tg\ \delta$ in a frequency range between about 10 kc./sec. and about 1000 kc./sec. which is less than about 0.06, and cooling the mixed crystal ferrite material thus obtained at a temperature rate less than about 10° C. per minute in an oxygen atmosphere to maintain the said oxygen content in said material.

16. The method of manufacturing a soft ferromagnetic core material, having low magnetic losses in a range of frequencies between 10 kc./sec. and 1000 kc./sec. particularly suited for cores in inductance coils and the like employed in radio circuits operating in the said range of frequencies, comprising the steps of heating a mixture of zinc ferrite and a second cubic ferrite to a temperature between about 900° C. and about 1400° C. in an oxygen controlling atmosphere to produce a homogeneous mixed crystal ferrite, and regulating the oxygen content of said mixed crystals ferrite to produce a mixed crystal ferrite material having a coefficient of losses $tg\ \delta$ in the range of frequencies between about 10 kc./sec. and about 1000 kc./sec. which is less than about 0.06.

17. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of pulverizing a mixture of copper ferrite and cadmium ferrite to an average grain size of less than about 1 micron in diameter, heating the mixture in an oxygen controlling atmosphere to a temperature of about 1000° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

18. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of pulverizing a mixture of copper ferrite and zinc ferrite to an average grain size of less than about 1 micron in diameter, heating the mixture in an oxygen controlling atmosphere to a temperature of between about 900° C. and about 1050° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

19. The method of manufacturing a soft ferromagnetic core material having low magnetic losses in a range of frequencies between 10 kc./sec. and 1000 kc./sec. and which is particularly suited for cores in inductance coils and the like employed in radio circuits operating in the said range of frequencies, comprising the steps pulverizing a mixture of magnesium ferrite and zinc ferrite to an average grain size of less than about 1 micron in diameter, heating the mixture in an oxygen controlling atmosphere to a temperature of about 1400° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

20. The method of manufacturing a soft ferromagnetic core material having low magnetic losses in a range of frequencies between 10 ks./sec. and 1000 kc./sec. and which is particularly suited for cores in inductance coils and the like employed in radio circuits operating in the said range of frequencies, comprising the steps of pulverizing a mixture of nickel ferrite and zinc ferrite to an average grain size of less than about 1 micron in diameter, heating the mixture in an oxygen controlling atmosphere to a temperature of about 1400° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

21. The method of manufacturing a soft ferromagnetic core material having low magnetic losses in a range of frequencies between 10 kc./sec. and 1000 kc./sec. and which is particularly suited for cores in inductance coils and the like employed in radio circuits operating in the said range of frequencies, comprising the steps of mixing approximately 25 mol. per cent of cadmium oxide, 25 mol. per cent of copper oxide, and 50 mol per cent of iron oxide, pulverizing said mixture to an average grain size of less than about 1 micron in diameter, heating the mixture in an oxygen atmosphere to a temperature of about 1000° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said mateial.

22. The method of manufacturing a soft ferromagnetic core material having low magnetic losses in a range of frequencies between 10 kc./sec. and 1000 kc./sec. and which is particularly suited for cores in inductance coils and the like employed in radio circuits operating in the said range of frequencies, comprising the steps of mixing approximately 20 mol. per cent of copper oxide, 30 mol. per cent of zinc oxide, and 50 mol. per cent of iron oxide, pulverizing said mixture to an average grain size of less than about 1 micron in diameter, heating the mixture in an oxygen atmosphere to a temperature between about 900° C. and about 1050° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

23. The method of manufacturing a soft ferromagnetic core material having low magnetic losses in a range of frequencies between 10 kc./sec. and 1000 kc./sec. and which is particularly suited for cores in inductance coils and the like employed in radio circuits operating in the said range of frequencies, comprising the steps of mixing approximately 28 mol. per cent of magnesium oxide, 18 mol. per cent of zinc oxide, and 54 mol. per cent of iron oxide, pulverizing said mixture to an average grain size of less than about 1 micron in diameter, heating the mixture in an oxygen atmosphere to a temperature of about 1400° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and 1000 kc./sec. which is less than about 0.06, and cooling the mixed crystal ferrite thus obtained at a temperature rate less than about 10° C. per minute to maintain the said oxygen content in said material.

24. The method of manufacturing a soft ferromagnetic core material having low magnetic losses in a range of frequencies between 10 kc./sec. and 1000 kc./sec. and which is particularly suited for cores in inductance coils and the like employed in radio circuits operating in the said range of frequencies, comprising the steps of mixing approximately 20 mol. per cent of nickel oxide, 30 mol. per cent of zinc oxide, and 50 mol. per cent of iron oxide, pulverizing said mixture to an average grain size of less than about 1 micron in diameter, heating the mixture in an oxygen atmosphere to a temperature of about 1400° C. to produce a homogeneous mixed crystal ferrite, regulating the oxygen content of said mixed crystal ferrite to produce a mixed crystal ferrite material having a coefficient of losses $tg\ \delta$ in a frequency range between about 10 kc./sec. and about 1000 kc./sec. which is less than about 0.06, and cooling the mixed crystal ferrite thus obtained at a temperature rate less than about 10° C. per minute to maintain the said oxygen content in said material.

25. The method of manufacturing a soft ferromagnetic core material having low magnetic losses in a range of frequencies between 10 kc./sec. and 1000 kc./sec. particularly suited for cores in inductance coils and the like employed in radio circuits operating in the said range of frequencies, comprising the steps of heating a mixture of a first metal oxide and iron oxide forming a first cubic ferrite and a second metal oxide and iron oxide forming a second cubic ferrite to a temperature between about 900° C. and 1400° C. in an oxygen controlling atmosphere to produce a homogeneous mixed crystal ferrite, and regulating the oxygen content of said mixed crystal ferrite to produce a mixed crystal ferrite material having a coefficient of losses $tg\ \delta$ in the range of frequencies between about 10 kc./sec. and about 1000 kc./sec. which is less than about 0.06.

JACOB LOUIS SNOEK.

REFERENCES CITED

The following references are of record in the file of this patent:

UNITED STATES PATENTS

| Number | Name | Date |
|---|---|---|
| 1,292,206 | Woodruff | Jan. 21, 1919 |
| 1,647,737 | Legg | Nov. 1, 1927 |
| 1,647,738 | Legg | Nov. 1, 1927 |
| 1,946,964 | Cobb | Feb. 13, 1934 |
| 1,876,230 | Kato et al. | Oct. 9, 1934 |

FOREIGN PATENTS

| Number | Country | Date |
|---|---|---|
| 466,678 | Great Britain | June 2, 1937 |

OTHER REFERENCES

J. W. Mellor, "Comprehensive Treatise on Inorganic and Theoretical Chemistry," Longmans, Green and Co., N. Y., 1932, vol. XII, pages 775–777 and 785.